(12) United States Patent
Fournier et al.

(10) Patent No.: US 6,651,764 B2
(45) Date of Patent: Nov. 25, 2003

(54) FUEL TANK FOR A RECREATIONAL VEHICLE

(75) Inventors: Andre Fournier, Sherbrooke (CA); Éric Bertrand, Sherbrooke (CA)

(73) Assignee: Bombardier Inc., Valcourt (CA)

( * ) Notice: Subject to any disclaimer, the term of this patent is extended or adjusted under 35 U.S.C. 154(b) by 94 days.

(21) Appl. No.: 09/928,458

(22) Filed: Aug. 14, 2001

(65) Prior Publication Data

US 2002/0020573 A1 Feb. 21, 2002

Related U.S. Application Data

(60) Provisional application No. 60/275,105, filed on Mar. 13, 2001.

(51) Int. Cl.$^7$ .............................................. B62M 27/02
(52) U.S. Cl. ...................... 180/190; 180/182; 180/69.4; 220/563
(58) Field of Search .............................. 180/190, 196, 180/186, 225, 69.4, 69.5; 220/563, 564, 565

(56) References Cited

U.S. PATENT DOCUMENTS

| | | | | |
|---|---|---|---|---|
| 4,179,036 A | * | 12/1979 | Pasini ........................... | 220/22 |
| 4,844,278 A | * | 7/1989 | Freiwald et al. ............. | 220/1 V |
| 5,031,795 A | * | 7/1991 | Kotera et al. ................. | 220/563 |
| 5,127,432 A | * | 7/1992 | Duhaime et al. ............ | 137/574 |
| 5,251,718 A | * | 10/1993 | Inagawa et al. ............. | 180/190 |
| 5,251,773 A | * | 10/1993 | Bowles et al. .............. | 220/86.2 |
| 5,660,245 A | * | 8/1997 | Marier et al. ................ | 180/190 |
| 5,979,417 A | * | 11/1999 | Hyodo et al. ................ | 123/516 |
| 6,213,514 B1 | * | 4/2001 | Natsume et al. ............. | 280/833 |
| 6,386,630 B1 | * | 5/2002 | Atherly .................. | 297/195.11 |

\* cited by examiner

*Primary Examiner*—Avraham Lerner
(74) *Attorney, Agent, or Firm*—Pillsbury Winthrop LLP

(57) ABSTRACT

A fuel tank for a motored vehicle featuring a main body portion and an oblong neck portion coupled to the main body portion. The oblong neck portion extends diagonally upward away from the main body portion. The main body portion is configured and positioned to provide a wave interference portion therein.

20 Claims, 8 Drawing Sheets

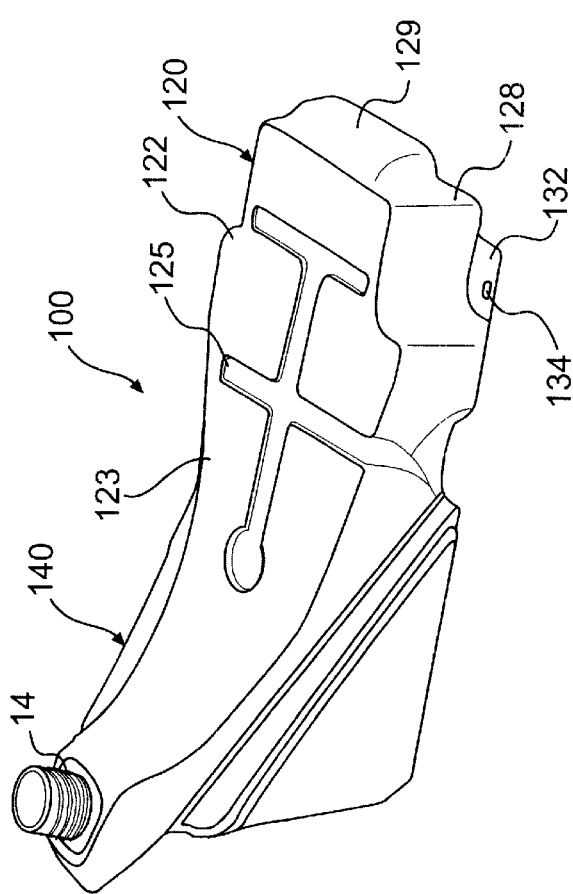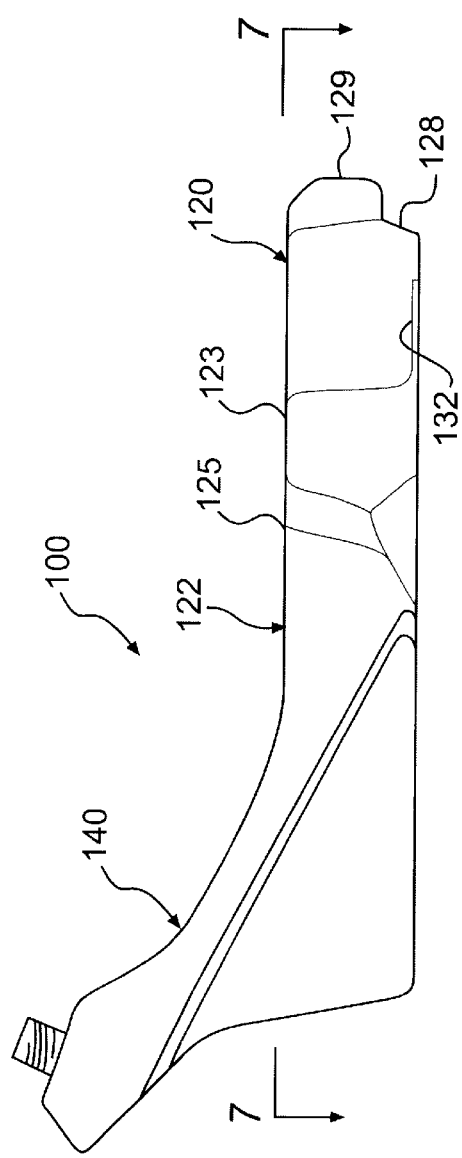

FUEL TANK FOR A RECREATIONAL VEHICLE

This application claims the benefit of priority to U.S. Provisional Patent Application Ser. No. 60/275,105, which was filed on Mar. 13, 2001. This application also incorporates herein by reference U.S. patent application Ser. No. 60/275,105, filed on Mar. 13, 2001, U.S. patent application Ser. No. 09/472,134, filed on Dec. 23, 1999 and U.S. Provisional Patent Application No. 60/167,614, which was filed on Nov. 26, 1999. This application also incorporates herein by reference Canadian Patent Application No. 2,256,944, filed on Dec. 23, 1998.

BACKGROUND OF THE INVENTION

1. Field of the Invention

The present invention relates generally to fuel containers. More specifically, the invention relates to fuel containers for motor vehicles, such as snowmobiles.

2. Background of the Invention

Canadian Patent Application No. 2,256,944 (the "'944 application") discloses a new improved recreational vehicle adapted for use as a snowmobile or an all-terrain vehicle. The vehicle disclosed therein is convertible from a snowmobile to an all-terrain vehicle and vice versa, and thus, can be used all year around both in winter and summer. The '944 application teaches, among other features, that the vehicle disclosed therein provides improved maneuverability and control than a conventional snowmobile, as the rider's seat position is moved forwardly and the engine is moved rearwardly by comparison with the a conventional snowmobile.

U.S. patent application Ser. No. 09/472,134 (the "'134 application") discloses a snowmobile where, among other features, the steering control position, the seating position, and the position of the footrests are arranged in relation to one another so that the rider's center of gravity is closer to the center of gravity of the vehicle than on a conventional snowmobile. Moreover, the snowmobile disclosed in the '134 application improves the rider's control over the vehicle and positions the rider so that he falls more naturally within a laminar air flow region defined by the windshield of the snowmobile. The '134 application discusses, inter alia, the advantages of providing improved positioning of the rider on the new snowmobile disclosed therein.

Further, U.S. provisional application 60/315,689 (the "'689 application") of the assignee of this application discloses yet another novel vehicle, which is a three-wheel vehicle, incorporating advantageous features of the vehicles disclosed in the '944 and '134 applications. The three-wheel vehicle disclosed in the '689 application is constructed in such a way that it also locates the engine closer to the center of gravity of the vehicle and moves the driver's position on the vehicle forward and closer to the center of gravity of the vehicle By positioning the driver closer to the engine and ground, vehicles can have a generally low center of gravity. A lower center of gravity helps to stabilize the vehicle when travelling at the high speeds or when travelling through bumpy terrain or over bumpy surfaces.

Conventional fuel tanks for a snowmobile, such as ones shown in FIG. 1, are not suitable for use in vehicles having the driver positioned more forwardly and the engine position more rearwardly than the convention snowmobile, as disclosed in the '944, '134 and '689 applications.

For example, FIG. 1 shows two conventional fuel tanks for use in snowmobiles, which are designated with reference numerals 10 and 10', provided on a snowmobile tunnel body 20. As illustrated, the fuel tanks 10, 10' include substantially round main body portions 12, 12', which house the fuel. The fuel tanks 10, 10' also have upwardly facing filler neck openings 14, 14' formed in the upper portions of the main body portions 12, 12', which allow fuel to be poured therethrough. The center of gravity of the fuel tanks illustrated in FIG. 1 are located approximately at the center of the main body portions 12, 12'. The centers of gravity of the two fuel tanks are designated in FIG. 1 as reference numerals 16, 16'.

As illustrated in FIG. 9, if one were to adopt the vehicle configurations described in the '944 and '134 applications and the above-mentioned co-pending application, the forward positioning of the driver 10 reduces the space that would otherwise be occupied by the fuel tank 10. When the conventional fuel tank 10 is placed as shown in FIG. 9, it interferes with the placement of the driver's seat in the same space.

SUMMARY OF THE INVENTION

Therefore, it is an object of the present invention to provide a fuel tank suitable for use in a recreational vehicle which is designed to take advantage of a positioning the driver that is closer to the engine.

Another object of the present invention is to provide a fuel tank suitable for use in the vehicles disclosed in the '944 and '134 applications and the above-mentioned co-pending application.

Yet another object of the present invention is to provide a fuel tank for a recreational vehicle, a snowmobile in particular, that has a low center of gravity which improves the stability and maneuverability of the vehicle.

In accordance with an aspect of the present invention, a fuel tank comprises a wall structure configured and positioned to define an outer surface having an inner liquid containing volume therein. The wall structure includes an inlet for liquid to enter the inner liquid containing volume. An outlet for liquid is provided as an exit for the liquid contained inside of the wall structure. The fuel tank further comprises an elongated main body portion above which a driver of the vehicle may be seated and an oblong neck portion. The oblong neck portion extends diagonally upward away from the main body portion. The main body portion extends along a substantially entire length of the tunnel on which the fuel tank is positioned. The main body portion of the fuel tank is positioned substantially under the seat of the snowmobile.

In accordance with another aspect of the present invention, the fuel tank has a ridge protruding inside the fuel tank's main body portion, which is defined by the wall structure. The ridge is positioned at a midportion of the longitudinal length of the fuel tank and is configured to provide interference to a liquid wave within the inner liquid. The ridge disrupts movement of the liquid from the front to the rear (or vice versa) inside the tank. This prevents the movement of fuel from exerting sudden forces on the vehicle. The ridge is also used to create a fuel pick-up area when the vehicle is climbing a hill.

Other aspects, features and advantages of the present invention will become apparent from the following detailed description, the accompanying drawings, and the appended claims.

BRIEF DESCRIPTION OF THE DRAWINGS

FIG. 3 is a perspective top view of the fuel tank constructed according to the present invention;

FIG. 4 is a side view of the fuel tank shown in FIG. 1;

DETAILED DESCRIPTION OF THE PREFERRED EMBODIMENTS OF THE INVENTION

Figure 1:
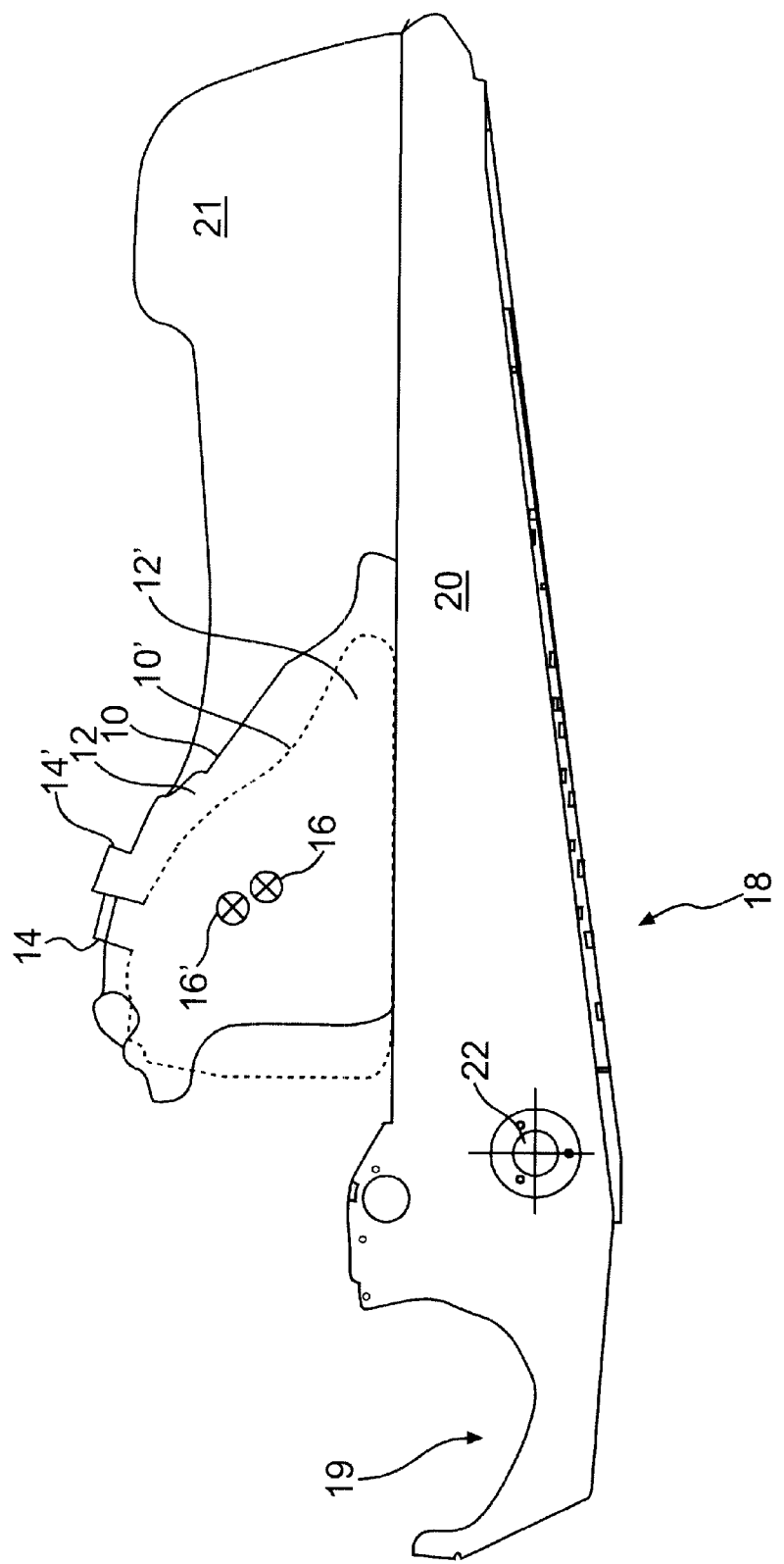
FIG. 1 is a side view of two prior art fuel tanks illustrating in particular the length thereof by comparison with tunnel bodies of conventional snowmobiles.
Figure 2:
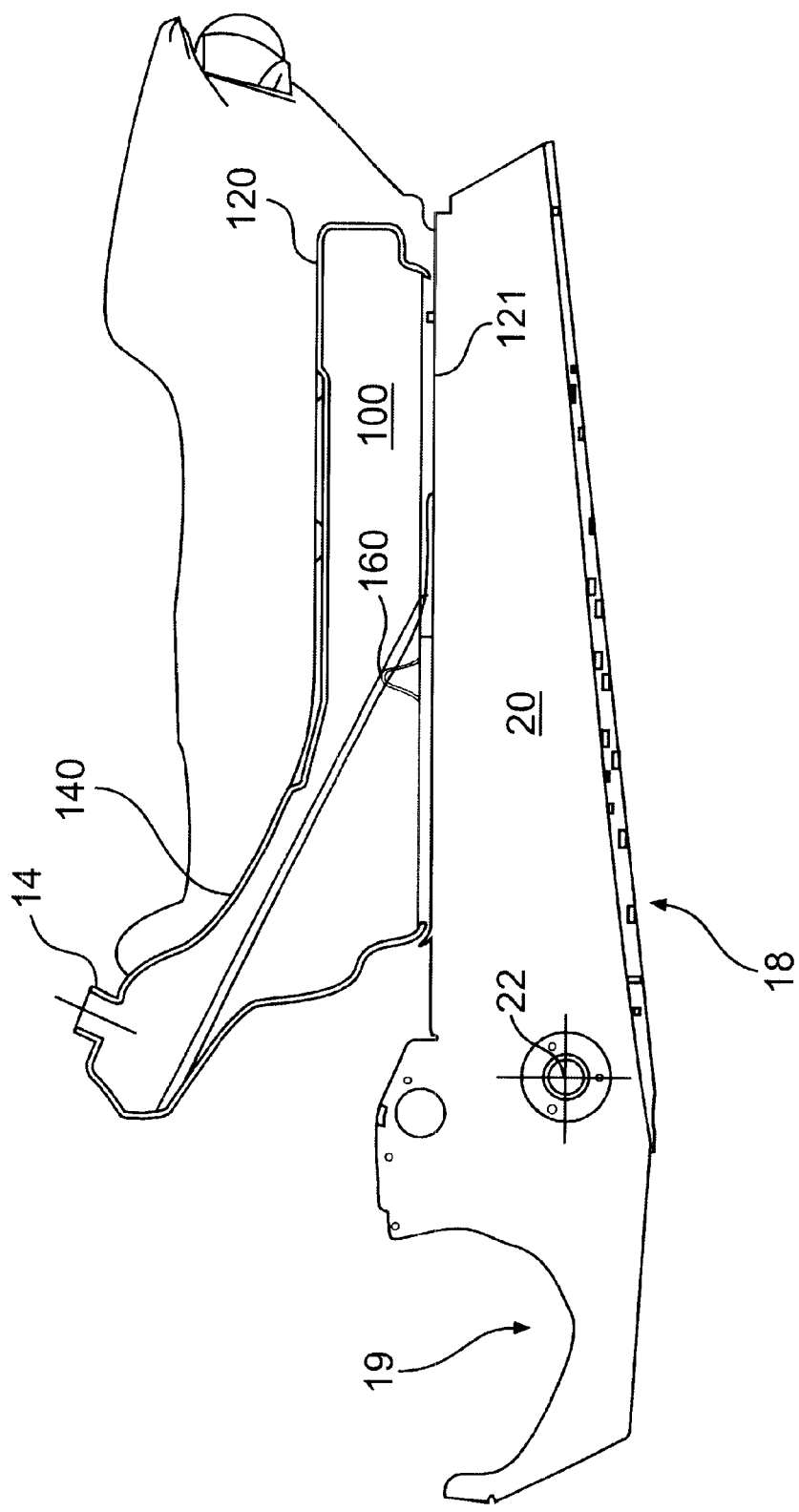
FIG. 2 is a side view of the fuel tank constructed according to the present invention, which illustrates the length thereof by comparison with the tunnel body of a snowmobile.

Generally, the fuel tank(s) herein contemplated are provided on a chassis of a recreational vehicle, such as a snowmobile. The chassis of such recreational vehicles provides structural support and is a platform to which such components as an engine, ground-engaging structure, front and rear suspension systems, and a sent are attached. A typical chassis of a conventional snowmobile is shown in FIG. 1, as an example. Specifically, a chassis 18 includes an engine cradle portion 19 at the forward section that contains an engine. The chassis 18 also includes an elongated tunnel body 20 that extends longitudinally rearwardly of the engine cradle potion 19.

Under the tunnel body 20, a rear suspension system and ground engaging endless track are provided (both not shown). In other types of recreational vehicles, such as the vehicles disclosed in the '944 application, ground engaging wheel(s) could be provided under the tunnel body 20 instead of a ground engaging endless track. Typically, a drive axle 22, generally in the form of a sprocket, is positioned through the chassis 18 for engaging an endless track to drive the snowmobile. On the top surface of the tunnel body 20, a fuel tank, such as the ones designated 10, 10', is provided. A seat 21 is provided on the tunnel body generally rearwardly of the fuel tank (10, 10') as shown in FIG. 1. As illustrated, the tunnel body 20 can have different longitudinal lengths depending on the intended applications, such as racing, touring or mountain snowmobiling. Although not illustrated, it is possible, though not always a standard practice, to vary the size of the seats and fuel tank in proportion to the length of the chassis 18.

As shown in FIG. 1, the conventional fuel tank 10 has a substantially round shape and a generally oblong configuration, which extends less than roughly one-half of the length of the chassis 18. For example, the ratio between the tunnel body 20 to the length of conventional fuel tanks 10, 10' is roughly 538:1358 and 631:1358, respectively (these ratios being the respective lengths of the elements in millimeters).

Some fuel tanks may even have a rearward extension, which does not carry fuel. The rearward extension supports the seat and driver/rider of the snowmobile by acting as a seat base.

Consequently, there exists a need in the art for a fuel tank which provides a low center of gravity and is capable of breaking up the disturbance waves which can generate forces that may interfere with the smooth operation of the recreational vehicle in which it is placed. Such a fuel tank may also incorporate a reserve supply of fuel therein.

FIGS. 2–9 show a fuel tank, generally indicated at 100, which is constructed according to the principles of the present invention. More specifically, FIGS. 2–6 show the fuel tank 100, which may be used in recreational vehicles, such as the snowmobile described in the '134 application and other snowmobiles, as well as the vehicles described in the '934 application and the above-mentioned co-pending application.

The fuel tank 100 includes a main body portion, generally indicated at 120, integrally coupled with an oblong neck portion, generally indicated at 140. The oblong neck portion 140 extends diagonally upward away from the main body portion 120. The fuel tank 100 can also be configured to define a wave interference portion or ridge 160 at the midportion of the longitudinal length thereof. The wave interference portion 160 is configured to provide interference to liquid disturbance waves, which may be generated within the fuel tank 100 when liquid, such as, for example, fuel or gasoline, moves from the front to the rear or vice versa, inside the fuel tank 100. The sloshing of fuel within the fuel tank 100 can adversely affect the operation of the vehicle on which it is placed by exerting sudden and unexpected forces on the vehicle.

In the illustrated embodiment, the fuel tank 100 is positioned within a vehicle frame, such as, for example, on the upper surface 121 of the tunnel body 20. However, it is contemplated that the fuel tank 100 may be positioned within any motored vehicle, such as a motorcycle or other recreational vehicle, and should not be limited to snowmobiles.

In the illustrated embodiment, the fuel tank 100 is formed by a blow molding process, which allows the main body, oblong neck and if desired the wave interference portions 120, 140, 160, respectively, to have a substantially equal wall thickness throughout. It may be preferable to mold the fuel tank 100 from high-density polyethylene (HDPE). Other suitable materials also may be used, so long as they are resistant to degradation by the liquid contained therein.

As best shown in FIGS. 3 and 4, the main body portion 120 is configured and positioned to extend to a height substantially equal to one-third the height of the oblong neck portion 140. The main body portion 120 is longitudinally elongated and is formed by an outer wall structure 122. The outer wall structure 122 has a hollow transverse cross-section, preferably substantially rectangular in form, so as to provide sufficient strength and support for the fuel tank 100. The main body portion 120 may also be tubular in form to add torsional rigidity of the fuel tank 100. The main body portion 120 includes an upper surface 123 being of substantially uniform height.

FIG. 3 shows the upper surface 123 of the outer wall structure 122. Formed in the upper surface 123 is a cross-like depression 125, which is substantially symmetrical about the longitudinal direction of the outer wall structure 122. Although not shown, the depression 125 may be configured to accept a portion of the snowmobile seat therein. The depression 125 may add to the overall rigidity of fuel tank 100.

Figure 5:
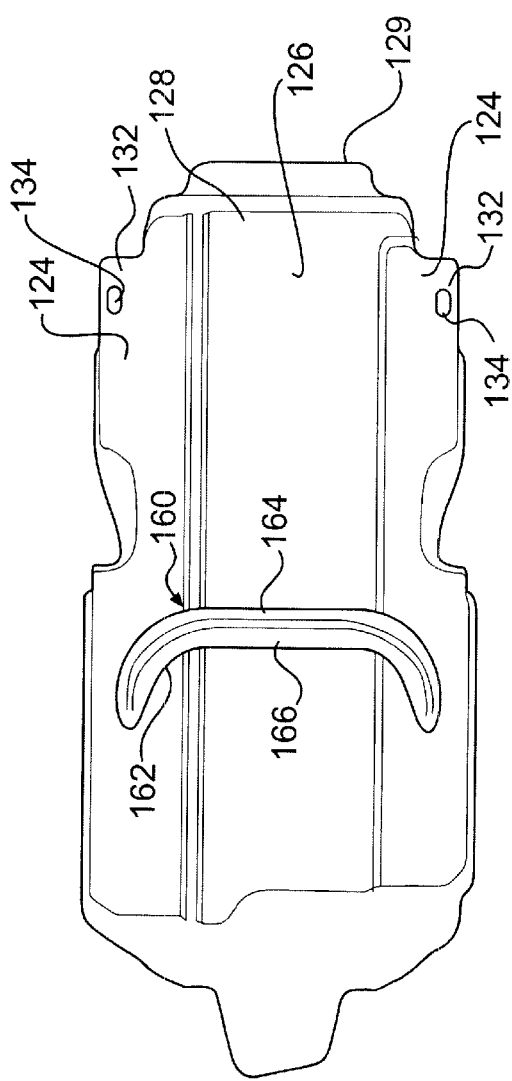
FIG. 5 is a bottom view of the fuel tank shown in FIG. 1.

As best shown in FIG. 5, a pair of tunnel engaging surfaces 124 are integrally formed with a generally flat bottom surface 126 on the underside of the main body portion 120. The tunnel engaging surfaces 124 are disposed on opposite sides of the bottom surface 126. Bottom surface 126 is situated at a higher level than tunnel engaging surfaces 124 to provide space for a radiator (not shown) which can be formed into the middle of tunnel body 20.

A pair of mounting flanges 132 are formed integrally with the fuel tank 100 and outwardly extend from the tunnel engaging surfaces 124 of the main body portion 120. Each mounting flange 132 has a elongated opening 134 therein to receive a conventional fastener (not shown) therethrough for affixing the fuel tank 100 onto the snowmobile's tunnel body 20. The fasteners may be screws, bolts and nuts, adhesive or any other fastener known in the art.

The fasteners securely mount the fuel tank 100 in close proximity to the tunnel body 20 such that the tunnel engaging surfaces 124 engage the tunnel body 20. The bottom surface 126 is preferably spaced from the tunnel body 20. Alternatively, in an embodiment not shown, the fuel tank 100 could be mounted onto or within a frame of a motor vehicle.

Figure 9:
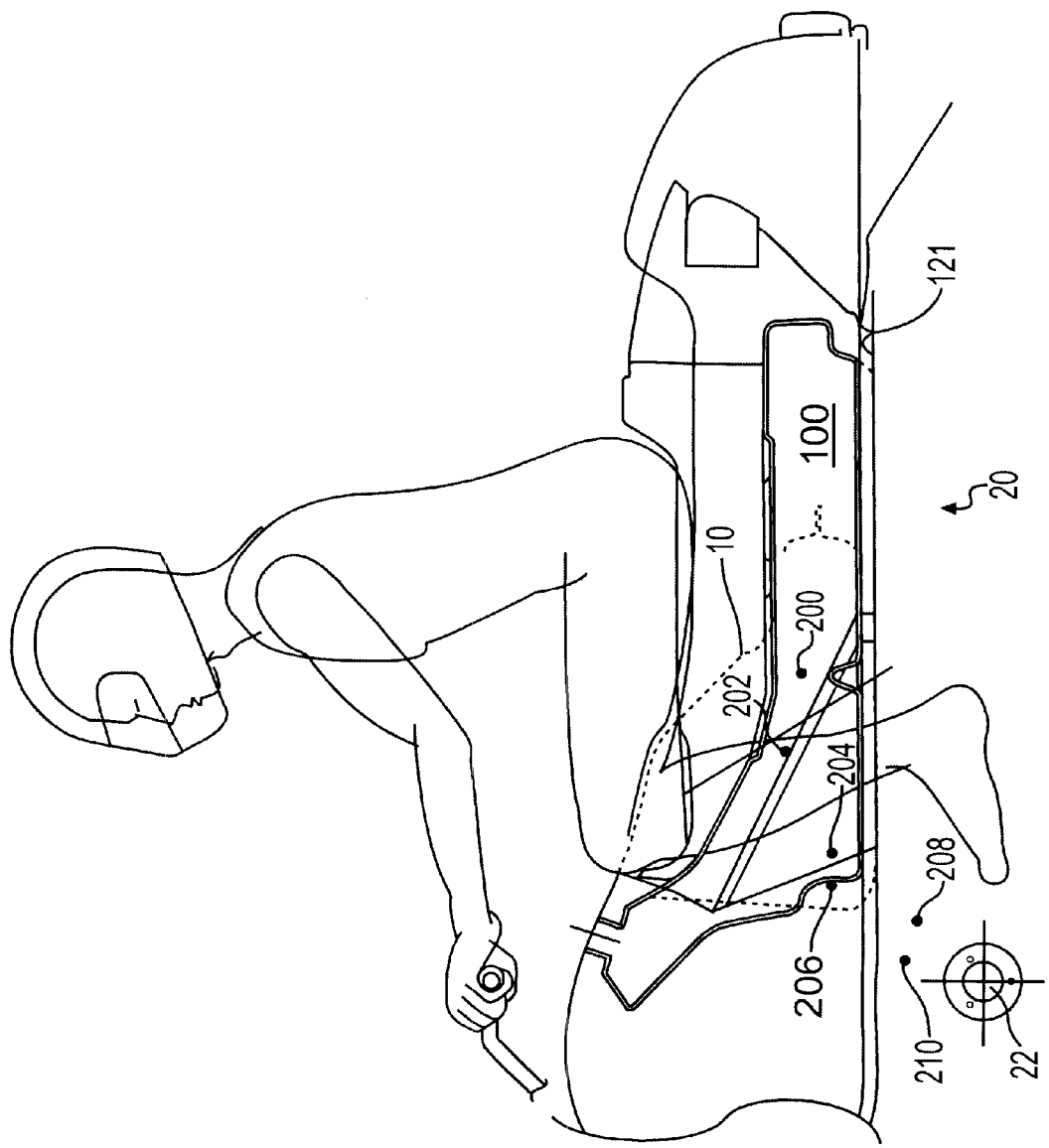
FIG. 9 is a side view showing the fuel tank positioned within a snowmobile having a center of gravity according to the present invention.

As illustrated in FIG. 9, the main body portion 120 is mounted to the tunnel body 20 so as to position the center of gravity 200 of the fuel tank 100 within a horizontal distance range of 375 mm to 500 mm and a vertical distance range of 240 mm to 255 mm away from the center of the drive axle 22. Preferably, the main body portion 120 is mounted onto the tunnel body 20 so as to position the center of gravity 200 of the fuel tank 100 at a horizontal distance of 437 mm and a vertical distance of 248 mm as measured from the center of the drive axle 22.

In FIG. 9, examples of different centers of gravity are illustrated. Center of gravity 200 is the center of gravity of the fuel tank 100. Center of gravity 202 is the center of gravity of the conventional fuel tank. Center of gravity 204 is the center of gravity of a snowmobile having the conventional fuel tank 10 when the fuel tank 10 is filled with gas and the driver is seated on the snowmobile. Center of gravity 206 is the center of gravity of a snowmobile having the fuel tank 100, when the fuel tank 100 contains fuel and the driver is seated on the snowmobile. Center of gravity 208 is the center of gravity of a snowmobile with the conventional fuel tank filled with fuel but without the driver seated on the snowmobile. Finally, center of gravity 210 is the center of gravity of a snowmobile carrying fuel tank 100 with fuel but without a driver (or operator).

As shown in FIGS. 1 and 9, the upper surface 121 of the tunnel body 20 supports the main body portion 120 of the fuel tank 100. As illustrated, the main body portion 120 has a length that is substantially equal to the length of the tunnel body 20 such that the ratio between the length of the fuel tank 100 and the length of the tunnel body 20 is substantially 1:1. This 1:1 ratio allows the fuel tank 100 to provide sufficient support for the seat of the snowmobile while also maximizing its fuel-containing capacity. The fuel tank 100 may have a width capable of providing sufficient support to a driver/rider, for example, in cases where the fuel tank 100 is positioned substantially under the seat of the vehicle.

However, it is contemplated that the fuel tank 100 may be positioned on tunnel bodies that are longer than the tunnel body 20. In these situations, the tunnel body, the seat and the fuel tank 100 could create a space directly behind the fuel tank 100 along the length of the tunnel body 20. This space may be used for storage, or some other purpose known in the art.

The oblong neck portion 140 includes the upwardly facing filler neck opening 14 for fuel to be poured therethrough into the fuel tank 100. Although not shown, a fuel cap could threadedly engage the filler neck opening 14 so as to provide a tight seal which precludes fuel from escaping from the fuel tank 100.

The oblong neck portion 140 has a smaller cross sectional area than does the main body portion 120 and extends upwardly therefrom by an angle of about 45°. Though shown extending upwardly from the main body portion at an angle of about 45°, the oblong neck portion 140 may have any suitable angular configuration that complements the construction of the vehicle in which it is positioned.

Figure 7:
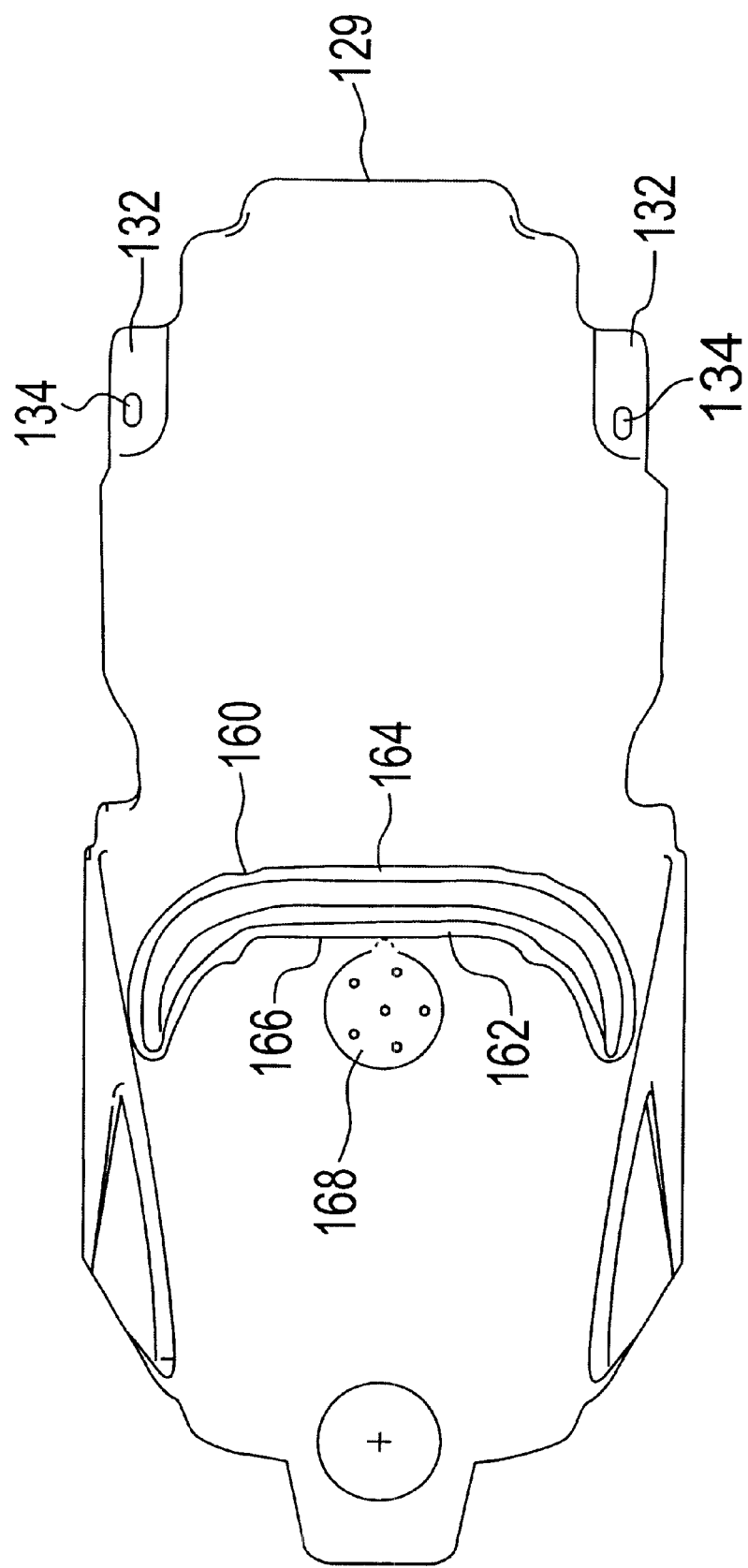
FIG. 7 is a cross sectional view of fuel tank taken along the line 7—7 in FIG. 4, showing the anti-wave portion.
Figure 8:
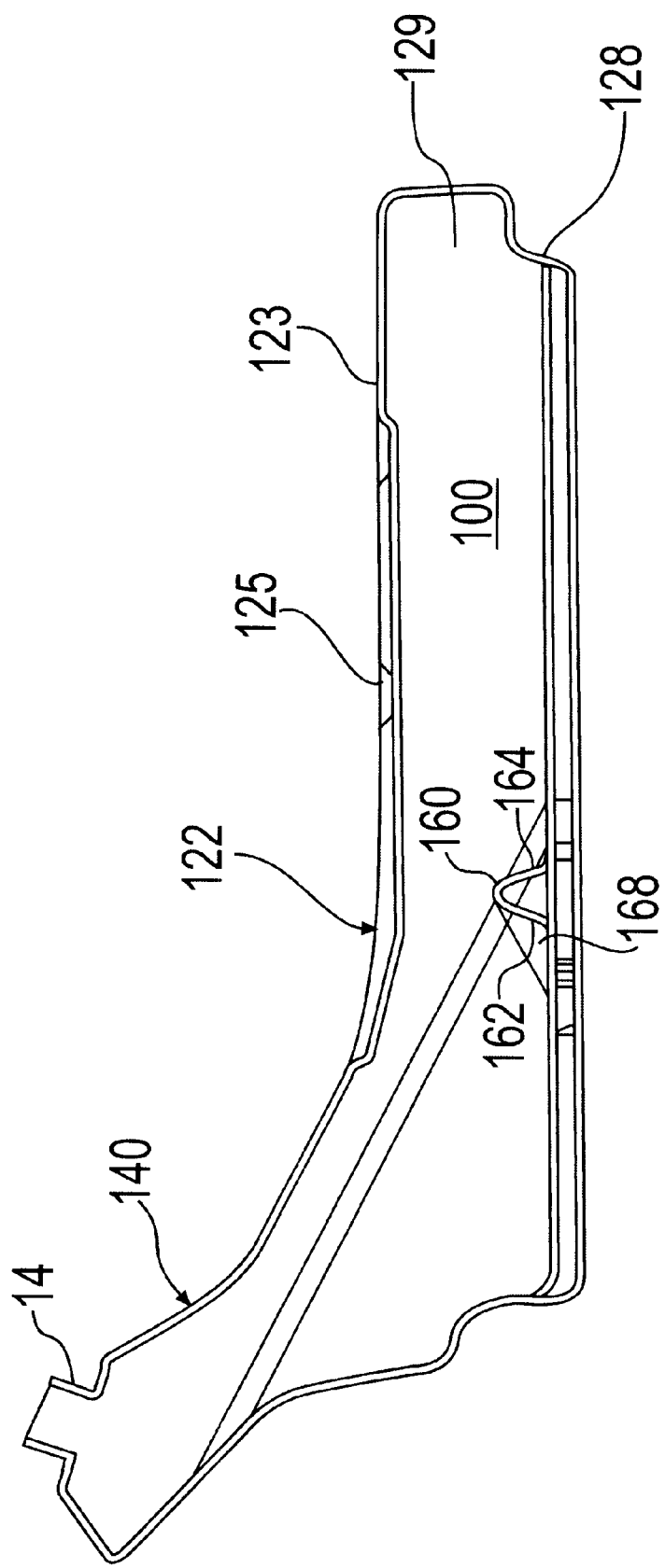
FIG. 8 is a cross sectional view of fuel tank, taken along the line 8—8 in FIG. 6, showing in greater detail the anti-wave portion in relation with the interior surface of the fuel tank.

As shown in FIGS. 7 and 8, the wave interference portion 160 is centrally disposed within the main body portion 120 so as to upwardly, integrally extend from the fuel volume defining wall 128 toward the interior of the fuel tank 100. The wave interference portion 160 is substantially U-shaped and includes a pair of angled interference surfaces 162, 164. The U-shape configuration has its open end facing the front of the fuel tank 10 and allows fuel to flow thereby on opposite ends thereof. The interference surfaces 162, 164 are integrally formed at converging angles with respect to one another so that the interference surface 162 is sloped downward toward the front of the fuel tank 10 and the interference surface 164 is sloped downward toward the rear of the fuel tank 10.

The interference surfaces 162, 164 may be disposed at any angle with respect to one another (greater than 0°, but less than 180°) within the main body portion 120. Alternatively, the interference surfaces may be vertically disposed (at an angle of 90°) within the main body portion 120. However, it may be preferable to construct each interference surface 162, 164 at an angle of about 66° as measured from the bottom surface 126 toward the interference surfaces 162, 164 such that the interference surfaces 162, 164 converge toward one another.

The angled interference surfaces 162, 164 are configured to break up (or interfere with the formation of) liquid disturbance waves in the fuel tank 100.

Figure 6:
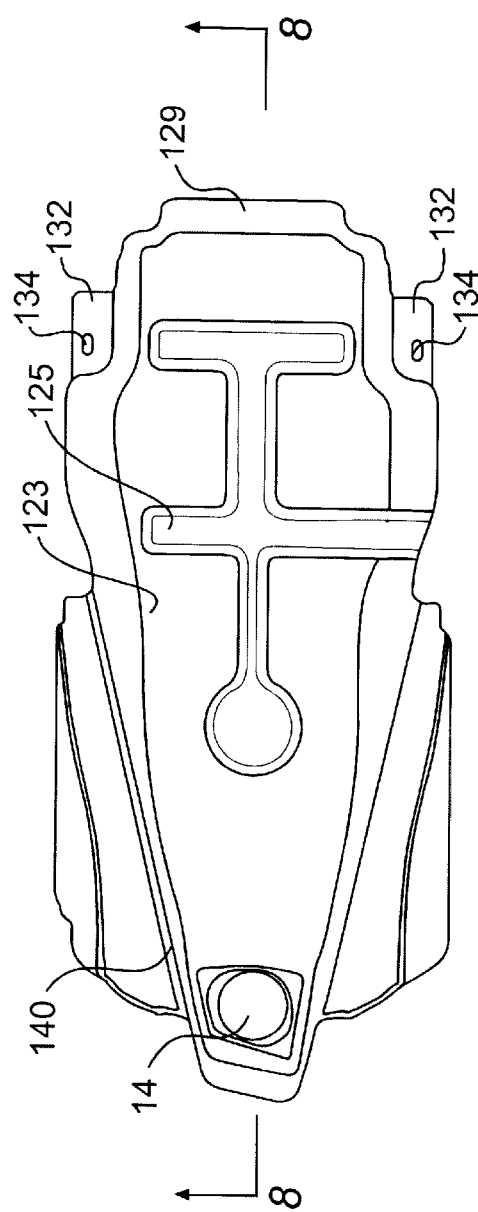
FIG. 6 is a top view of the fuel tank shown in FIG. 1.
Figure 10:
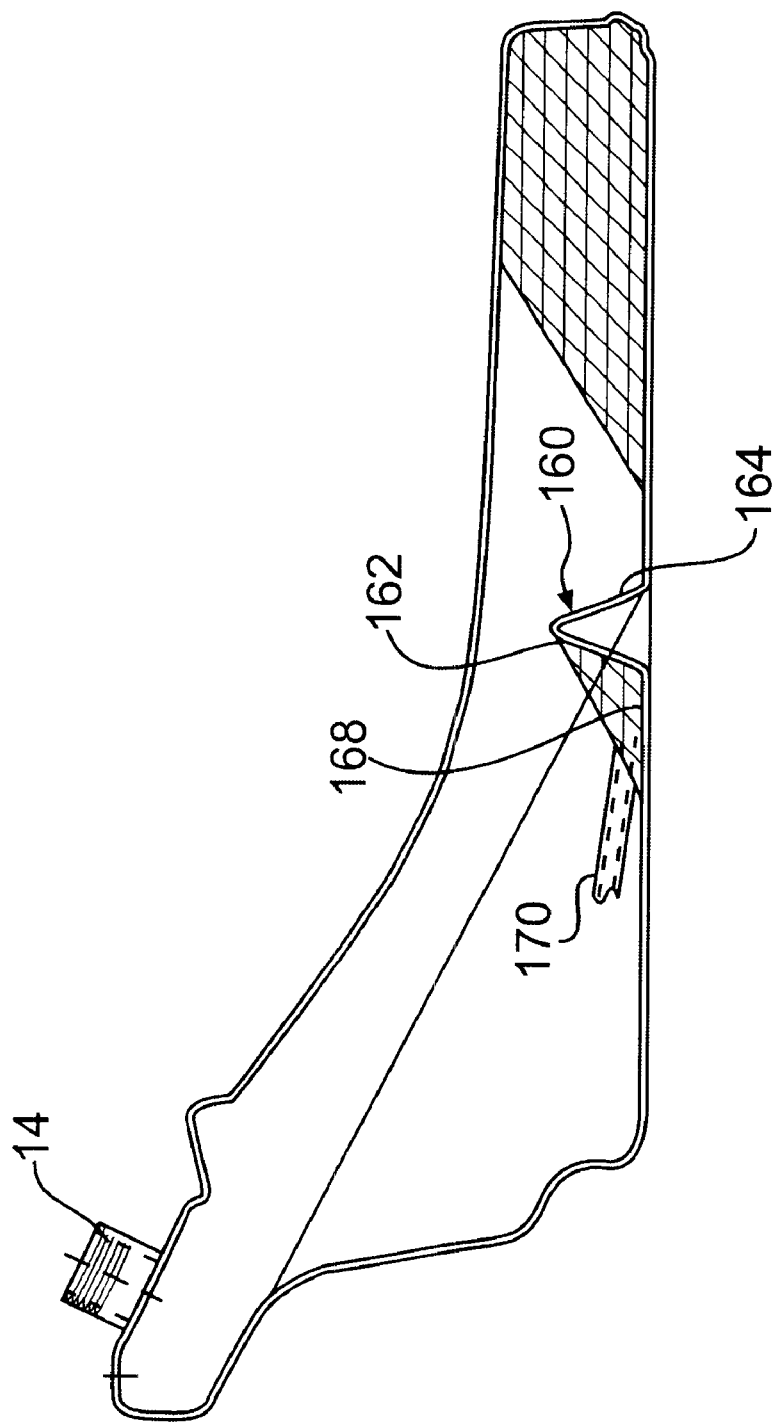
FIG. 10 is a side view of the fuel tank shown in FIG. 2, which shows more clearly a fuel supply hose in communication with the fuel contained therein.

As best shown in FIGS. 6, 7 and 10, the angled interference surface 162 is configured and positioned to have an arcuate central portion 166 for trapping fuel therein when disposed at an angle, such as when the snowmobile is traveling up a mountainside, hill, or other sloped surface. The trapped fuel essentially forms a reserve fuel reservoir 168. A fuel supply hose 170 may be disposed in communication with the reserve fuel reservoir 168 to supply the fuel contained therein to the engine of the vehicle.

The fuel tank 100 has a low (close to the ground) center of gravity as described above. The low center of gravity provides stability and balance when travelling at high rates of speed. This stability and balance help reduce the risk of the snowmobile rolling over when turning at a high rate of speed, such as during racing conditions It is desirable for vehicles to have a low center of gravity in racing situations where vehicles are subjected to sudden acceleration. In response to these sudden accelerations (or if travelling up a steep slope), disturbance waves of fuel can build up and move within the fuel tank, thus generating forces that may disrupt the operation of the snowmobile to such an extent that the disturbance can be felt by the driver/rider.

As the disturbance waves begin to build up and move within the fuel tank 100, some waves contact the angled interference surfaces 162, 164 of the wave interference portion 160. The angled interference surfaces 162, 164 are configured to break up the waves by providing interference thereto. By breaking up the disturbance waves, the angled interference surfaces 162, 164 preclude disturbance of the driver/rider due to the forces generated by the disturbance waves in response to sudden movement within a vehicle.

In addition to breaking up the disturbance waves, the arcuate central portions 166 of the angled interference surface 162 traps fuel therein when the snowmobile is traveling up a mountainside, hill, or other sloped surface. Even if there is a minimal amount of fuel within the fuel tank 100, as the fuel moves toward the rear of the fuel tank 100 due to the snowmobile travelling up a sloped surface, a small quantity of fuel will be trapped by the arcuate central portions 166 of the angled interference surface 162. That way, the fuel supply hose 170 can continuously supply fuel to the engine from the reserve fuel reservoir 168.

While the principles of the invention have been made clear in the illustrative embodiments set forth above, it will be apparent to those skilled in the art that various modifications may be made to the structure, arrangement, proportion, elements, materials, and components used in the practice of the invention It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed:

1. A vehicle, comprising:
   a body;
   a fuel tank disposed adjacent to the body, the fuel tank being constructed and arranged to contain fuel, the fuel tank having
   a wall structure configured and positioned to define an outer surface having a liquid containing volume therein, said wall structure including an inlet for liquid to enter the liquid containing volume and an outlet for liquid to exit the liquid containing volume, and
   a wave interference portion defined by the wall structure and configured and positioned to provide interference to a liquid wave within the liquid containing volume, wherein the body has an upper surface of a certain length for supporting the fuel tank, wherein the main body portion has a length substantially equal to the length of the body such that the ratio between the length of the fuel tank and the length of the body is substantially 1:1.

2. A vehicle according to claim 1, wherein the wall structure comprises:
   a main body portion; and
   an oblong neck portion coupled to the main body portion extending diagonally upward away from the main body portion,
   wherein the wave interference portion is positioned within the main body portion.

3. A vehicle according to claim 2, wherein the wave interference portion includes an interference surface configured and positioned to have an arcuate central portion constructed and arranged to trap fuel therein.

4. A vehicle according to claim 3, wherein the main body portion is configured and positioned to extend to a height substantially equal to one-third the height of the oblong neck portion.

5. A vehicle according to claim 4, wherein the main body portion includes a substantial section thereof being of uniform height.

6. A vehicle according to claim 1, further comprising:
   a drive axle for engaging a drive assembly to provide rotational movement thereto for movement of the recreational vehicle, wherein the fuel tank has a center of gravity positioned within a horizontal range of 375 mm to 500 mm and a vertical range of 240 mm to 255 mm away from the drive axle.

7. A vehicle according to claim 6, wherein the fuel tank has a center of gravity positioned at a horizontal distance of 437 mm and a vertical distance of 248 mm away from the drive axle.

8. A vehicle comprising:
   a tunnel body;
   a fuel tank disposed adjacent to the tunnel body, the fuel tank constructed and arranged to contain fuel, the fuel tank having
   a main body portion,
   an oblong neck portion coupled to the main body portion extending diagonally upward away from the main body portion, and
   a wave interference portion defined by the main body portion and configured and positioned to provide interference to a liquid wave within the main body portion.

9. A vehicle according to claim 8, wherein the main body portion and the oblong neck portion together define a liquid containing volume which includes an inlet for liquid to enter the liquid containing volume and an outlet for liquid to exit the liquid containing volume.

10. A vehicle according to claim 9, wherein the main body portion is configured and positioned to extend to a height substantially equal to one-third the height of the oblong neck portion.

11. A vehicle according to claim 10, wherein the wave interference portion includes an interference surface configured and positioned to have an arcuate central portion constructed and arranged to trap fuel therein.

12. A vehicle according to claim 8, wherein the tunnel body has an upper surface of a certain length for supporting the fuel tank, wherein the main body portion has a length being substantially equal to the length of the tunnel body such that the ratio between the length of the fuel tank and the length of the tunnel body is substantially 1:1.

13. A vehicle according to claim 12, further comprising:
   a drive axle for engaging a drive assembly to provide rotational movement thereto for movement of the snowmobile, wherein the fuel tank has a center of gravity positioned within a horizontal range of 375 mm to 500 mm and a vertical range of 240 mm to 255 mm away from the drive axle.

14. A vehicle according to claim 13, wherein the container has a center of gravity positioned at a horizontal distance of 437 mm and a vertical distance of 248 mm away from the drive axle.

15. A vehicle, comprising:
   a tunnel body having a top surface;
   a fuel tank disposed above the top surface of the tunnel body, the fuel tank being constructed and arranged to contain fuel, the fuel tank having a wall structure configured and positioned to define an outer surface having a liquid containing volume therein, said wall structure including an inlet for liquid to enter the liquid containing volume and an outlet for liquid to exit the liquid containing volume; and a seat disposed above the fuel tank wherein the seat is suitable for supporting a driver of the vehicle, wherein the fuel tank comprises a main body portion disposed between the seat and the top surface of the tunnel body and an oblong neck portion extending diagonally upward away from the main body portion, the oblong neck portion having a liquid inlet.

16. The vehicle of claim 15, wherein the main body portion has a rectangular cross section having a lower surface and an upper surface, the lower surface being disposed on the top surface of the tunnel body.

17. The vehicle of claim 16, wherein the height between the lower surface and the upper surface is approximately ⅓ the height of the upwardly extending oblong neck portion.

18. The vehicle according to claim 15, wherein the main body portion has a length substantially equal to the length of the tunnel body such that the ratio between the length of the fuel tank and the length of the tunnel body is substantially 1:1.

19. The vehicle according to claim 18, further comprising:
a drive axle for engaging a drive assembly to provide rotational movement thereto for movement of the vehicle, wherein the fuel tank has a center of gravity positioned within a horizontal range of 375 mm to 500 mm and a vertical range of 240 mm to 255 mm away from the drive axle.

20. The vehicle according to claim 19, wherein the fuel tank has a center of gravity positioned at a horizontal distance of 437 mm and a vertical distance of 248 mm away from the drive axle.

* * * * *